United States Patent
Chun et al.

(10) Patent No.: US 10,456,768 B2
(45) Date of Patent: Oct. 29, 2019

(54) ALUMINUM OXIDE FORMING HEAT TRANSFER TUBE FOR THERMAL CRACKING

(71) Applicant: ExxonMobil Chemical Patents Inc., Baytown, TX (US)

(72) Inventors: ChangMin Chun, Annandale, NJ (US); Jorge J. Perdomo, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/999,414

(22) Filed: Aug. 20, 2018

(65) Prior Publication Data

US 2019/0078182 A1   Mar. 14, 2019

Related U.S. Application Data

(60) Provisional application No. 62/557,516, filed on Sep. 12, 2017.

(51) Int. Cl.
*B01J 19/00* (2006.01)
*C10G 9/20* (2006.01)
(Continued)

(52) U.S. Cl.
CPC ......... *B01J 19/0026* (2013.01); *B01J 19/002* (2013.01); *B01J 19/02* (2013.01); *B22D 13/00* (2013.01); *C10G 9/203* (2013.01); *C10G 9/36* (2013.01); *C22C 19/05* (2013.01); *C22C 19/055* (2013.01); *C22C 19/058* (2013.01); *C22C 30/00* (2013.01); *C22C 38/005* (2013.01); *C22C 38/06* (2013.01); *C22C 38/40* (2013.01); *C22C 38/44* (2013.01); *C22C 38/48* (2013.01); *C23C 8/10* (2013.01); *F16L 9/02* (2013.01);
(Continued)

(58) Field of Classification Search
CPC ...... B01J 19/02; B01J 19/002; B01J 19/0026; B01J 19/1812; C10G 9/203; C22C 38/005; C22C 38/06; C22C 38/44–50
See application file for complete search history.

(56) References Cited

U.S. PATENT DOCUMENTS

| 4,248,629 A | 2/1981 | Pons et al. |
| 5,206,880 A | 4/1993 | Olsson |

(Continued)

FOREIGN PATENT DOCUMENTS

WO   2016/099740 A   6/2016

*Primary Examiner* — Lessanework Seifu (57) ABSTRACT

This application relates to a heat transfer tube, its method of manufacture and its use for thermal cracking hydrocarbon feeds, such as thermal cracking in furnaces. The heat transfer tube comprises a chromium and aluminum carburization-resistant alloy capable of generating a typically continuous aluminum oxide scale under thermal cracking conditions that reduces coking and thereby enhances heat transfer. The carburization-resistant alloy comprises 25.1 to 55.0 wt. % nickel; 18.1 to 23.9 wt. % chromium; 4.1 to 7.0 wt. % aluminum; and iron. Additionally, the carburization-resistant alloy has at least one strengthening mechanism to provide desirable mechanical properties. The carburization-resistant alloy composition is also resistant to the formation of cracks during centrifugal casting.

22 Claims, 1 Drawing Sheet

(51) Int. Cl.
*C22C 30/00* (2006.01)
*C22C 19/05* (2006.01)
*C22C 38/48* (2006.01)
*C22C 38/00* (2006.01)
*C22C 38/06* (2006.01)
*B01J 19/02* (2006.01)
*B22D 13/00* (2006.01)
*C10G 9/36* (2006.01)
*C23C 8/10* (2006.01)
*F16L 58/08* (2006.01)
*F16L 9/02* (2006.01)
*C22C 38/40* (2006.01)
*C22C 38/44* (2006.01)
*B22D 13/02* (2006.01)
*C22C 38/04* (2006.01)
*C22C 38/38* (2006.01)
*C22C 38/46* (2006.01)
*C22C 38/54* (2006.01)
*C21D 9/08* (2006.01)

(52) U.S. Cl.
CPC .............. *F16L 58/08* (2013.01); *B22D 13/02* (2013.01); *C21D 9/08* (2013.01); *C22C 38/04* (2013.01); *C22C 38/38* (2013.01); *C22C 38/46* (2013.01); *C22C 38/54* (2013.01)

(56) References Cited

U.S. PATENT DOCUMENTS

| | | | |
|---|---|---|---|
| 5,242,665 | A | 9/1993 | Maeda et al. |
| 6,231,807 | B1 | 5/2001 | Berglund |
| 8,431,230 | B2 | 4/2013 | Takahashi et al. |
| 8,906,511 | B2 | 12/2014 | Chun et al. |
| 9,249,482 | B2 | 2/2016 | Jakobi et al. |
| 2005/0129567 | A1 | 6/2005 | Kirchheiner et al. |
| 2009/0016929 | A1 | 1/2009 | Garrett |
| 2016/0168480 | A1* | 6/2016 | Spicer .................... C22C 30/00 208/130 |

* cited by examiner

ALUMINUM OXIDE FORMING HEAT TRANSFER TUBE FOR THERMAL CRACKING

CROSS-REFERENCE OF RELATED APPLICATIONS

This application claims the benefit of Provisional Application No. 62/557,516, filed Sep. 12, 2017, the disclosure of which is incorporated herein by reference.

FIELD OF THE INVENTION

This application relates to a heat transfer tube and its use for thermal cracking hydrocarbon feeds, such as thermal cracking in furnaces. The heat transfer tube comprises a chromium and aluminum carburization-resistant alloy capable of generating an aluminum oxide scale under thermal cracking conditions that reduces coking and thereby enhances heat transfer. The carburization-resistant alloy has at least one strengthening mechanism to provide desirable high temperature mechanical properties. The carburization-resistant alloy composition is also resistant to the formation of cracks during centrifugal casting.

BACKGROUND OF THE INVENTION

Thermal cracking or pyrolysis of hydrocarbon feeds, such as thermal cracking hydrocarbon feeds in the presence of steam ("steam cracking"), is a commercially important technology for producing light olefins such as ethylene, propylene, and butadiene. Typical hydrocarbon feeds include, e.g., one or more of ethane and propane, naphtha, heavy gas oils, crude oil, etc. Thermal cracking furnaces generally include a radiant section containing at least one heat transfer tube and at least one burner for heating the hydrocarbon feed. When the heat transfer tubes in the radiant section are arranged in coils, it is typical to call these "radiant coils".

In one conventional thermal cracking process, a hydrocarbon and steam mixture is indirectly heated in at least one radiant section heat transfer tube ("radiant tube"), primarily by the transfer of heat from one or more burners to the radiant tube's exterior surface, e.g., radiant heat transfer from flames and high temperature flue gas produced in one or more burners, radiant heat transfer from the interior surfaces of a firebox enclosure, convective heat transfer from combustion gases traversing the radiant section, etc. The transferred heat rapidly raises the temperature of the hydrocarbon feed to the desired coil outlet temperature (COT), which typically ranges from about 1450° F. (788° C.) for some very heavy gas oil feeds to about 1650° F. (899° C.) or even 1700° F. (927° C.) for ethane or propane feeds.

Heat transferred to the hydrocarbon feed located in one or more of the radiant tubes results in thermal cracking of at least a portion of the hydrocarbon to produce a radiant coil effluent comprising molecular hydrogen, light olefin, other hydrocarbon byproducts, unreacted steam (if the thermal cracking is steam cracking), and unreacted hydrocarbon feed. Transfer line piping is typically utilized for conveying radiant coil effluent from the radiant section to a quenching stage. Coke accumulates during the thermal cracking on internal surfaces of the radiant tubes. After an undesirable amount of coke has accumulated, a flow of decoking mixture, typically an air-steam mixture, is substituted for the hydrocarbon+steam mixture for removing accumulated coke. Decoking effluent is conducted away. Following coke removal, the flow of hydrocarbon feed is restored to the decoked tubes. The process continues, with alternating pyrolysis (thermal cracking) mode and decoking mode. The radiant tubes experience significant mechanical stress as they expand and contract between the alternating cracking and decoking process modes. The tubes experience even more mechanical stress when a furnace shutdown/startup is required.

Selectivity to light olefins during pyrolysis mode is favored by short contact time, high temperatures, and low hydrocarbon partial pressures. For this reason radiant tubes typically operate at a temperature (measured at the tube metal) as high as 2050° F. (1121° C.). Radiant tubes are therefore manufactured from alloys having desirable properties at high temperature, such as high creep-strength and high rupture-strength. Since the tubes are exposed to a carburizing environment during hydrocarbon pyrolysis, the alloy is typically carburization-resistant. And since the tubes are exposed to an oxidizing environment during decoking, the alloy is typically oxidation resistant. Conventional heat transfer tube alloys include austenitic Fe—Cr—Ni heat resistant steels having variations of steam cracker alloys based on a composition having 25 wt. % chromium and 35 wt. % nickel (referred to as a "25 Cr/35 Ni alloy"), or a composition having 35 wt. % chromium and 45 wt. % nickel (referred to as a "35 Cr/45 Ni alloy"). It is conventional to employ differing compositions of minor alloying elements, for example, silicon, in order to enhance high temperature strength and/or carburization resistance.

Iron and nickel are known as catalysts to the formation of carbon deposits ("coke") on the inner surface of the radiant tube. In conventional alloys, a surface oxide layer comprising $Cr_2O_3$ typically forms during pyrolysis. This oxide is believed to protect iron and nickel sites from contact with the hydrocarbon during pyrolysis mode, thereby lessening the amount of undesirable coke formation. It is observed, however, that under more severe pyrolysis conditions, e.g., conditions typically utilized for increasing light olefin yield, the formation of this protective oxide layer is suppressed in favor of carbon containing phases, e.g., $Cr_3C_2$, $Cr_7C_3$, and/or $Cr_{23}C_6$. Accordingly, discontinuities develop over time in the carburization-resistant oxide scale located on the tube's inner surface, resulting in iron and nickel exposure to the hydrocarbon feed, leading to an increase in the rate of coke formation.

In an attempt to overcome this difficulty, U.S. Pat. No. 8,431,230 discloses increasing the tube's carburization resistance by employing an alloy containing 2 to 4 wt. % aluminum. The alloy is said to form an $Al_2O_3$ scale during pyrolysis mode that remains in a stable oxide even under conditions where chromium preferentially forms carbides rather than oxides. Since such carburization-resistant alloys have a lower creep-strength and lower rupture-strength than do conventional heat transfer tube alloys that do not contain aluminum, commercial examples in industry have limited the amount of aluminum to no more than 4 wt. %. Problems encountered with higher aluminum alloys include formation of cracks during centrifugal casting and creep or rupture related failures when used for thermal cracking. Other references of interest include U.S. Pat. No. 9,249,482; US 2009/0016929; US 2005/0129567; U.S. Pat. Nos. 6,231, 807; 5,206,880; and 4,248,629.

U.S. Pat. No. 8,906,511 discloses increasing the tube's carburization resistance by employing an alloy containing 5 to 10 wt. % aluminum. The reference discloses a tube structure wherein a continuous inner member formed from the aluminum-containing alloy is bonded to the inner surface of a tubular outer member which comprises a higher-strength alloy to compensate for the lower creep and rupture strength of the aluminum-containing layer. The dual-layer construction of these tubes is economically demanding.

Thus, there remains a need for heat transfer tubes having higher aluminum content to suppress the formation of chromium-carbide phases but also having high temperature mechanical strength without resorting to dual-layer construction.

SUMMARY OF THE INVENTION

The invention relates to a heat transfer tube comprising, a carburization-resistant alloy that provides these desired features. The carburization-resistant alloy comprises 25.1 to 55.0 wt. % nickel; 18.1 to 23.9 wt. % chromium; 4.1 to 7.0 wt. % aluminum; iron; and at least one strengthening mechanism component. It has been found that the carburization-resistant alloy can form a substantially-continuous protective layer on the inner surface of a heat transfer tube. It also has been found that the protective layer is substantially resistant to carburization during pyrolysis, and does not appreciably degrade the tube's mechanical strength or spalling-resistance in comparison with conventional heat transfer tubes.

The protective layer comprising the specified carburization-resistant alloy preferably extends over the entire inner surface of the tube. In certain aspects, the aluminum oxide layer is substantially free of chromium.

To achieve the desired mechanical strength, the specified carburization-resistant alloy comprises at least one strengthening mechanism. The strengthening mechanism can comprise carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon; or at least one of a) gamma prime (γ) strengthening mechanisms comprising Ni3Al and less than 0.15 wt. % carbon; b) solid solution strengthening mechanisms comprising 2.0 to 4.0 wt. % of at least one element selected from vanadium, niobium, tantalum, molybdenum, tungsten, and less than 0.4 wt. % carbon; and c) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

In certain aspects the, heat transfer tube is centrifugally cast. The invention also relates to a method for producing a heat transfer tube comprising, providing a carburization-resistant alloy and centrifugally casting the carburization-resistant alloy to produce a heat transfer tube.

Additionally, the invention relates to a method for producing olefins comprising, pyrolysing a hydrocarbon feed in a heat transfer tube comprising a carburization-resistant alloy, where the carburization-resistant alloy comprises a) 25.1 to 55.0 wt. % nickel; b) 18.1 to 23.9 wt. % chromium; c) 4.1 to 7.0 wt. % aluminum; d) iron; and f) at least one strengthening mechanism.

BRIEF DESCRIPTION OF THE DRAWING

The invention is further explained in the description that follows with reference to the drawing illustrating, by way of non-limiting example, various embodiments of the invention wherein: The FIGURE illustrates a schematic flow diagram of one type of pyrolysis furnace.

DETAILED DESCRIPTION

Definitions

For the purpose of this description and appended claims, the following terms are defined. "Periodic Table" means the PERIODIC CHART OF THE ELEMENTS, The Merck Index, 12$^{th}$ Ed., Merck & Co., Inc., 1996.

Unless otherwise indicated, all amounts, concentrations, and weight percentages recited herein are based on the total weight of the referenced composition, e.g., first steam cracker alloy, second steam cracker alloy, etc., as the case may be.

Figure 1:
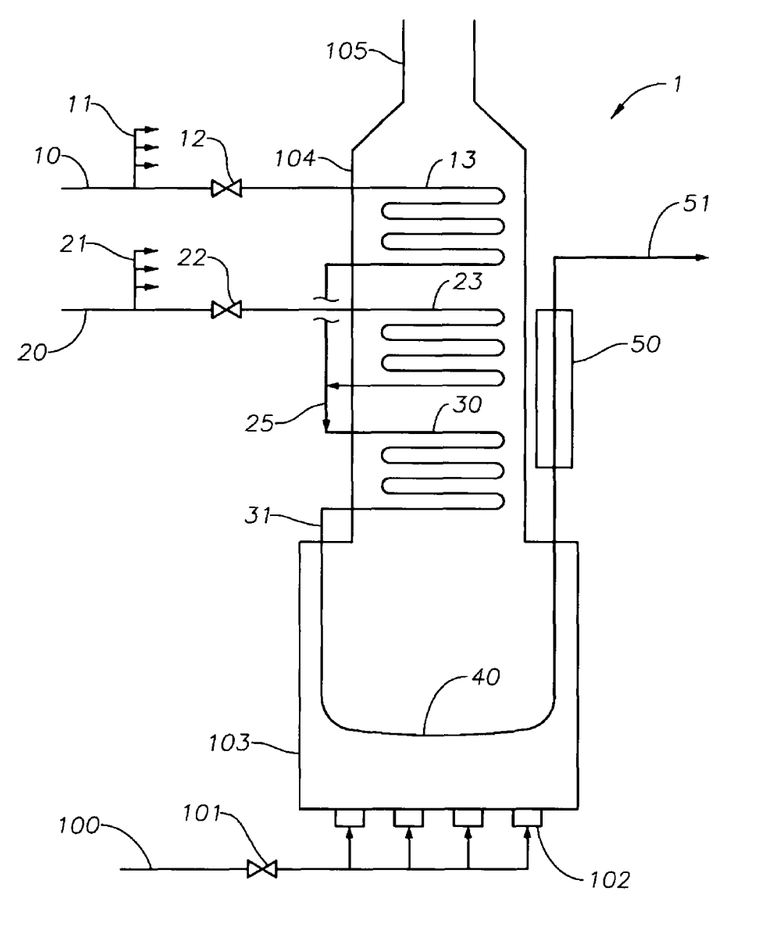

The spirit and scope of the apparatus and processes disclosed herein is not limited to the selected aspects, and this description is not meant to foreclose other aspects within the broader scope of the invention. Moreover, one skilled in the art will appreciate that FIG. 1 is not depicted in any particular proportion or scale, and that many variations can be made to the illustrated aspects. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Heat Transfer Tubes

The invention relates to heat transfer tubes made from carburization-resistant alloy having desirable high temperature mechanical strength. The term "heat transfer tube" includes tubes providing heat transfer functionality (among other functionalities, if any) in other processes for upgrading hydrocarbon, including those in which carburization may occur, such as conduits for transporting or conveying hydrocarbon process streams which may be prone to coking. "Heat transfer tube" also includes but is not limited to any of the following members of a pyrolysis furnace: feed conduits; dilution steam conduits; steam cracker furnace tubes, such as convection tubes and/or radiant tubes, including those arranges in one or more coils; cross-over piping; transfer line exchangers; quench zone conduits; and other components in the pyrolysis process that may be exposed to a hydrocarbon at a temperature exceeding 500° C. (930° F.).

The heat transfer tube made from the carburization-resistant alloy described herein may be formed by any convenient method of manufacture including centrifugal casting, static casting, extrusion, forging, rolling, joining, machining, etc. Conventional methods can be used, but the invention is not limited thereto. Preferred method for manufacturing the inventive heat transfer tubes are centrifugal casting and equivalent methods. Exemplary centrifugal casting apparatus and methods are described in U.S. Pat. No. 5,223,278, incorporated herein by reference in its entirety. The invention, however, is not limited thereby.

Embodiments of the invention include a method for producing a heat transfer tube comprising providing the specified carburization-resistant alloy and centrifugally casting the carburization-resistant alloy to produce a heat transfer tube.

The inventive heat transfer tubes may also contain one or more mixing elements (sometimes referred to as a "bead" or "fin") such as those described in U.S. Patent Application Publication Number 2016/0168480; U.S. Pat. Nos. 5,950,718; 7,799,963; and Provisional U.S. Application No. 62/502,249, and U.S. application Ser. No. 15/954,249, incorporated by reference. Embodiments of the invention include a heat transfer tube comprising the specified carburization-resistant alloy and one or more mixing elements.

Heat Transfer Tube Alloy

The invention described herein relates to heat transfer tubes comprising a carburization-resistant alloy containing sufficient aluminum to form a carburization-resistant aluminum oxide layer. Unexpectedly, the layer is observed to from when the inner surface of the tube is exposed to thermal cracking conditions. However, the invention is not limited to forming the layer in this manner. In any embodiment of the invention, the carburization-resistant alloy comprises from 18.1 to 23.9 wt. % chromium and 4.1 to 7.0 wt. % aluminum, preferably 4.5 to 6.5 wt. % aluminum. In certain embodiments, the alloy components are evenly dispersed in the alloy. The relatively higher amounts of aluminum promotes formation of a carburization-resistant aluminum oxide layer over at least a portion the heat transfer tube's inner surface.

Besides forming an aluminum oxide layer, the inventive heat transfer tube carburization-resistant alloy has desirable mechanical strength. The carburization-resistant alloy further comprises 25.1 to 55.0 wt. % nickel (preferably 30.0 to 50.0 wt. % nickel), 18.1 to 23.9 wt. % chromium (preferably 20.0 to 21.9 wt. % chromium), and iron. In certain embodiments, iron typically makes up ≥90 wt. % balance of the alloy composition.

Certain embodiments contain little or no amount of silicon to enhance strength. Silicon is believed to decrease mechanical strength serving as a deoxidizer. Embodiments of the invention include the carburization-resistant alloy further comprises less than 0.5 wt. % silicon.

Manganese may be present in the carburization-resistant alloy, e.g., to serve as an oxygen and/or sulfur scavenger when the alloy is in the molten state. When such scavenging functionality is desired, manganese is generally present at a concentration of ≤ about 3.0 wt. %, e.g., ≤ about 2.5 wt. %, or ≤ about 2.0 wt. %, or ≤ about 1.5 wt. %, or ≤ about 1.0 wt. %, or ≤ about 0.5 wt. %, or ≤ about 0.1 wt. %, or about 0 wt. % manganese. Ranges of the manganese content in the carburization-resistant alloy that are expressly disclosed include combinations of any of the above-enumerated values, e.g., 0 to about 3.0 wt. % manganese, 0 to about 2.5 wt. %, 0 to about 2.0 wt. %, 1.0 to about 2.0 wt. %, 1.5 to 2.5 wt. % manganese, etc.

Boron may be present in the carburization-resistant alloy and improve grain boundary performance. Generally boron may be present in an amount of 0 to about 0.1 wt. %, e.g., 0 to 0.07 wt. %, 0 to about 0.5 wt. %, or 0.05 to about 0.1 wt. %.

The carburization-resistant alloy may also include one or more rare-earth elements, i.e., 15 elements of the lanthanide series ranging from lanthanum to lutetium in the Periodic Table, and yttrium and scandium, particularly cerium, lanthanum and neodymium, in an amount of about 0.005 to about 0.4 wt. %. As for the rare-earth elements to be incorporated into the present alloy, cerium, lanthanum and neodymium may form, in a combined amount, at least about 80%, more preferably at least about 90%, of the total amount of the rare-earth elements. The presence of rare earth elements is believed to contribute to the formation and stabilization of the carburization-resistant layer.

Carburization-resistant alloys containing phosphorous, sulfur, and other impurities, such as those inevitably incorporated into the alloy when the material is prepared, are within the scope of the invention. Those skilled in the art will appreciate that the amount of these impurities should not be so large as to exceed the amounts that are typical in conventional steam cracker alloys.

Carburization-Resistant Layer

The heat transfer tubes described herein include a protective layer (e.g., a scale) in the tube's internal channel. The protective layer, referred to herein as a carburization-resistant layer, lessens the tube's tendency toward carburization during thermal cracking, particularly proximate to the tube's inner surface. The term "carburization-resistant" in this context means that the layer lessens the diffusion of carbon into the carburization-resistant alloy. The presence of a carburization-resistant layer on the exposed surface of the heat transfer tube can be detected by exposing that surface for 24 hours to at least one of the specified hydrocarbon feeds under thermal cracking conditions which include a temperature ≥1050° F. (566° C.) and a pressure ≥2 bar and then measuring the amount of carbon that has diffused into the alloy. The presence of a carburization-resistant layer is indicated when the amount of carbon that has diffused into the carburization-resistant alloy is ≤0.1 wt. %.

The carburization-resistant layer comprises alumina and typically forms over at least a portion, e.g., ≥90%, such as or ≥95%, or ≥99%, or ≥99.9%, substantially all, essentially all, or 100% of the inner surface area of the heat transfer tube (namely, the surface exposed to pyrolysis conditions). In some aspects, the carburization-resistant layer is substantially free of chromium, particularly a layer that is substantially free of chromium carbide, for example, the carburization-resistant aluminum oxide layer contains <0.1 wt. %, <0.01 wt. %, or <0.001 wt. % chromium. In particular aspects, the carburization-resistant layer comprises $Al_2O_3$, e.g., greater than 90, 95, 98, 99 wt. % $Al_2O_3$, including 91 to 100 wt. % $Al_2O_3$, 95 to 100 wt. % $Al_2O_3$, and 98 to 99 wt. % $Al_2O_3$.

The carburization-resistant layer is typically a substantially-continuous layer at the heat transfer tube's inner surface. The term "substantially continuous" means the carburization-resistant layer has the form of a substantially single region covering ≥50% of the surface area of the heat transfer tube's inner surface, e.g., ≥75%, such as ≥90%, or ≥95%, or more, typically ≥90%. The remainder of the surface area of the heat transfer tube's inner surface typically has the form of discontinuous regions (islands) dispersed within and/or around the substantially-continuous (or even continuous) carburization-resistant layer. The dispersed islands can have compositions selected from among those specified for the carburization-resistant layer, but this is not required provided ≥75% of the heat transfer tube's inner surface area comprises the specified carburization-resistant alloy in the form of (i) a substantially-continuous (or even continuous) layer and optionally (ii) islands. In certain aspects, about 0.1% to 10% of the heat transfer tube's inner surface area is covered by islands having a composition that is different from that of the substantially-continuous (or continuous) carburization-resistant layer, e.g., an island comprising one or more conventional austenitic Fe—Cr—Ni alloy. While not wishing to be bound by any theory or model, it is believed that the formation of a carburization-resistant layer at the heat transfer tube's inner surface results from the specified carburization-resistant alloys having a greater aluminum content than conventional heat transfer tube alloys. For example, a conventional alloy containing >24 wt. % chromium and <4.0 wt. % aluminum would lead to formation of a semi-continuous $Al_2O_3$ layer, roughly 70 area % $Al_2O_3$ and 30 area % $Cr_2O_3$. The 30 area % chromium oxide portion of such a protective layer would suffer from the described chromium carburization.

The carburization-resistant layer's thickness is not critical, but is typically ≥1.0 nm. The oxide layer (monolayer or multi-layer) typically has a thickness in the range of from about 1 μm to about 100 μm. In some exemplary aspects the carburization-resistant layer may be ≥1.0 nm, e.g., ≥ about 5.0 nm, such as ≥ about 10.0 nm, or ≥ about 25.0 nm, or ≥ about 50.0 nm, or ≥ about 100.0 nm, or ≥ about 1.0 μm, or ≥ about 5.0 μm, or ≥ about 7.5 nm. Additionally or alternatively, the thickness of the carburization-resistant layer may be ≤ about 10.0 μm, e.g., ≤ about 7.5 μm, or ≤ about 5.0 μm, or ≤ about 1.0 μm, or ≤ about 100.0 nm, or ≤ about 50.0 nm, or ≤ about 25.0 nm, or ≤ about 10.0 nm, or ≤ about 5.0 nm. Exemplary ranges of the carburization-resistant layer include combinations of any of the above enumerated values, e.g., 1.0 nm to 100.0 μm, or from 10.0 nm to 50.0 μm, or 100.0 nm to 10.0 μm. Optionally, the carburization-resistant layer is of substantially uniform thickness, but this is not required. The thickness of the heat transfer tube's carburization-resistant layer proximate to the tube outlet can be greater than the thickness proximate to the tube inlet, or vice-versa. In other aspects, the carburization-resistant layer's thickness is greatest at a location between the tube's inlet and outlet. Although one carburization-resistant layer (a monolayer) can be used, the invention is not limited thereto. In certain aspects, the heat transfer tube includes a plurality of the carburization-resistant layers, the layers being independently selected from among any of the specified carburization-resistant monolayers. One or more layers ("B" layers) having compositions (typically oxides) that are not among the specified carburization-resistant monolayers can be sandwiched between layers comprising any of the specified carburization-resistant oxides ("A" layers). "B" layers can comprise, e.g., conventional heat transfer tube alloys, including austenitic Fe—Cr—Ni alloys. It has been found that doing so unexpectedly strengthens the heat transfer tubes and provides increased spalling-resistance at the tubes internal surface during pyrolysis operations. Configurations such as T-A-B-A-S and T-B-A-B-A-S can be used, where T represents the outward (not layered) part of the heat transfer tube (comprising the tube's base alloy) and S represents the tube's inner surface. As indicated, the innermost layer is an "A" layer. The layers can be of equal thickness, but this is not required. Typically, "B" layers are thicker than "A" layers, e.g., the thickness of a "B" layer can be 1.1 to 5 times the thickness of an adjacent "A" layer.

In certain aspects, the carburization-resistant layer may be formed by exposing the heat transfer tube to a controlled low oxygen partial pressure environment, including gaseous environments having thermodynamic oxygen partial pressures less than that of air. Non-limiting examples of a controlled low oxygen partial pressure environment are a refinery or petrochemical plant steam, gaseous $H_2O:H_2$ mixture and a gaseous $CO_2:CO$ mixture. The controlled low oxygen partial pressure environment may further contain other gases such as $CH_4$, $N_2$, $O_2$, He, Ar and hydrocarbons, which may further enable formation of carburization-resistant layer. Therefore, the carburization-resistant layer may be formed prior to exposure of the heat transfer tube to steam cracking process conditions. Suitable temperatures for the controlled low oxygen partial pressure environment are typically ≥ about 500° C., e.g., 500° C. to 1200° C., or from 600° C. to 1100° C. Exposure times are typically ≥ about 1 hour, e.g., 1 hour to 500 hours, or from 1 hour to 300 hours, or from 1 hour to 100 hours.

The foregoing carburization-resistant layer may alternatively be formed by heat treating the interior of the heat transfer tube in an oxidizing atmosphere of at least 1050° C. In the case where this heat treatment is conducted at a temperature of below 1050° C. (but not lower than 900° C.), the lower limit for the rare earth elements in the carburization-resistant alloy should be 0.06 wt. %, with the upper limit for tungsten set at 2 wt. %.

In aspects where the carburization-resistant layer is formed by heat treatment, e.g., by exposing the inner surface of the heat transfer tube to a temperature of at least 1050° C. in an oxidizing atmosphere, the formation of $Al_2O_3$ in the carburization-resistant layer is facilitated by a rare earth element concentration of ≥0.005 wt. %.

Strengthening Mechanisms

In addition, the carburization-resistant alloy that makes up the heat transfer tube's carburization-resistant layer comprises at least one strengthening mechanism component to improve high temperature strength. Carbides strengthening mechanisms are one suitable component. Carbides strengthening mechanisms arise from precipitation of MC, $M_6C$, $M_7C_3$, and $M_{23}C_6$ type carbide phases where M is the metallic carbide forming element.

MC carbide is usually a large blocky carbide, random in distribution, and generally not desired. $M_6C$ carbides are also blocky. However, formed in grain boundaries as fine and discrete precipitates during a centrifugal casting process, both MC and $M_6C$ can be used to control grain size and strengthen the alloy.

$M_7C_3$ carbides, predominately $(Cr,Fe)_7C_3$, form at grain boundaries and are beneficial if precipitated as discrete particles since these carbides reduce grain boundary sliding. $M_{23}C_6$ carbides show a propensity for grain boundary precipitation. Discrete grain boundary precipitates enhance rupture strength. Those skilled in the art will appreciate that since the specified protective layer is carburization-resistant, the formation of additional carbides (i.e., in addition to those included in the protective layer for strengthening) during pyrolysis is attenuated. See. e.g., Examples 4 and 5 of Table 1, which indicate the presence of strengthening compounds comprising carbide in the carburization-resistant alloy before the formation of the protective layer under pyrolysis conditions.

Thus, embodiments of the carburization-resistant alloy comprise a carbides strengthening mechanism comprising 1.0 to 2.0 wt. % of at least one element selected from titanium, zirconium, hafnium, vanadium, niobium, tantalum, molybdenum, and tungsten.

In certain embodiments of the invention, the carburization-resistant alloy comprises a) 25.1 to 55.0 wt. % nickel; b) 18.1 to 23.9 wt. % chromium; c) 4.1 to 7.0 wt. % aluminum; d) 1.0 to 2.0 wt. % of at least one element selected from titanium (Ti), zirconium (Zr), hafnium (Hf), vanadium (V), niobium (Nb), tantalum (Ta), molybdenum (Mo), tungsten (W); e) carbon; and f) iron (Fe).

The metallic carbides formed in the carbides strengthening mechanism will contain an amount of carbon depending on the particular metals present in the carbides. A desired amount of carbon in the carburization-resistant alloy having a carbides strengthening mechanism includes 0.4 to 0.6 wt. % carbon.

In certain embodiments of the invention, the carburization-resistant alloy comprises a) 25.1 to 55.0 wt. % nickel; b) 18.1 to 23.9 wt. % chromium; c) 4.1 to 7.0 wt. % aluminum; d) 1.0 to 2.0 wt. % of at least one element selected from titanium (Ti), zirconium (Zr), hafnium (Hf), vanadium (V), niobium (Nb), tantalum (Ta), molybdenum (Mo), tungsten (W); e) 0.4 to 0.6 wt. % carbon; and f) iron (Fe).

Suitable strengthening mechanism components also include gamma prime strengthening mechanisms. Gamma prime (γ') strengthening mechanisms arise from precipitation of a $Ni_3Al$ type gamma prime phase that can be formed during a centrifugal casting process which involves melting and rapid solidification of the molten alloy containing significant amount of Ni and Al. In addition to Al, other elements such as Ti, Nb, Ta, and V can preferentially partition to the gamma prime precipitates and promote the creation of the gamma prime phase. The gamma prime phase being present in a carburization-resistant alloy acts as a barrier to dislocation motion within the alloy crystal structure, and therefore increases the strength of the alloy due to its ordered nature and high coherency with the austenitic alloy matrix.

Embodiments of the carburization-resistant alloy comprise gamma prime (γ') strengthening mechanisms comprising $Ni_3Al$ and less than 0.15 wt. % carbon.

In certain embodiments of the invention, the carburization-resistant alloy comprises a) 25.1 to 55.0 wt. % nickel; b) 18.1 to 23.9 wt. % chromium; c) 4.1 to 7.0 wt. % aluminum; d) a gamma prime (γ') strengthening mechanisms comprising $Ni_3Al$ and less than 0.15 wt. % carbon; and e) iron.

Additional suitable strengthening mechanism components include solid solution strengthening mechanisms. Solid solution strengthening mechanisms arise from difference in atomic diameter. For instance, Co, Fe, Cr, Mo, W, V, Ti, and Al are known to be solid solution strengtheners in Ni. These elements differ with Ni in atomic diameter from 1 to 13%. Therefore, lattice expansion related to atomic diameter oversize is related to the hardening. At thermal cracking operating temperatures, which is in the range of high temperature creep, strengthening is diffusion dependent. Therefore, relatively large and slow diffusing elements such as V, Nb, Ta, Mo, and W are the most effective hardeners.

Thus, embodiments of the carburization-resistant alloy comprise solid solution strengthening mechanisms comprising 2.0 to 4.0 wt. % of at least one element selected from vanadium, niobium, tantalum, molybdenum, tungsten, and less than 0.4 wt. % carbon.

Certain embodiments of the invention include a carburization-resistant alloy comprising a) 25.1 to 55.0 wt. % nickel; b) 18.1 to 23.9 wt. % chromium; c) 4.1 to 7.0 wt. % aluminum; d) <0.4 wt. % carbon; e) 2.0 to 4.0 wt. % of at least one element selected from V, Nb, Ta, Mo, W; and f) iron.

Yet another suitable strengthening mechanism component includes oxide dispersoid strengthening mechanisms. These mechanisms arise from dispersion of the nanometer-sized oxide precipitates that can be formed during a centrifugal casting process which involves melting and rapid solidification of the molten alloy. For instance, Y, La, Ce, Sc, and mischmetals which include about 50% Ce and 25% La with small amounts of Nd and Pr, are known to be formed an oxide dispersoid due to their high oxygen affinity. These oxide particles are incoherent within the alloy lattice. Therefore, oxide dispersoid decreases movement of dislocations within the alloy and in turn prevents creep.

Thus, embodiments of the carburization-resistant alloy comprise solid solution strengthening mechanisms comprising 0.1 to 1.0 wt. % of at least one element selected from yttrium, lanthanum, cerium, scandium, praseodymium, neodymium and less than 0.4 wt. % carbon.

Certain embodiments of the invention include a carburization-resistant alloy comprising a) 25.1 to 55.0 wt. % nickel; b) 18.1 to 23.9 wt. % chromium; c) 4.1 to 7.0 wt. % aluminum; d) <0.4 wt. % carbon; e) 0.1 to 1.0 wt. % of at least one element selected from Y, La, Ce, Sc, Pr, Nd; and e) iron.

The specified carburization-resistant alloy may comprise a combination of one or more of the aforementioned strengthening mechanisms. Though it will be noted that the carbides strengthening mechanism is unique in its higher concentration of carbon compared to the others. Thus, the carburization-resistant alloy may comprise a carbides strengthening mechanism or at least one of (including combinations) gamma prime, solid solution, and oxide dispersion strengthening mechanism components.

Embodiments of the invention include the specified heat transfer alloy comprising at least one strengthening mechanism. The at least one strengthening mechanism comprises:
(i) carbidic strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon; or at least one of:
(ii) gamma prime (γ') strengthening mechanisms comprising $Ni_3Al$ and less than 0.15 wt. % carbon;
(iii) solid solution strengthening mechanisms comprising 2.0 to 4.0 wt. % of at least one element selected from vanadium, niobium, tantalum, molybdenum, tungsten, and less than 0.4 wt. % carbon; and
(iv) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

Preferred combinations of strengthening mechanisms includes (ii) and (iii); (ii) and (iv); (iii) and (iv); and (ii), (iii), and (iv).

Steam Cracking Furnace

The heat transfer tubes made from the carburization-resistant alloy are useful in thermal cracking, e.g., steam cracking, to produce light olefin, such as ethylene and/or propylene. Embodiments of the invention relate to a method for producing olefins comprising pyrolysing a hydrocarbon feed in a heat transfer tube comprising the specified carburization-resistant alloy.

A non-limiting exemplary steam cracking furnace is depicted in the FIGURE. Steam cracking furnace 1 includes a radiant firebox 103, a convection section 104 and flue gas exhaust 105. Fuel gas is provided via conduit 100 and control valve 101 to burners 102 that provide radiant heat to a hydrocarbon feed to produce the desired pyrolysis products by thermal cracking of the feed. The burners generate hot gas that flows upward through the convection section 104 and then away from the furnace via conduit 105.

Hydrocarbon feed is conducted via conduit 10 and valve 12 to at least one convection coil 13. Hydrocarbon feed introduced into convection coil 13 is preheated by indirect contact with hot flue gas. Valve 12 is used to regulate the amount of hydrocarbon feed introduced into convection coil 13. Convection coil 13 is typically one of a plurality of convection coils that are arranged in a first coil bank for parallel flow of hydrocarbon feedstock. Typically, a plurality of feed conduits 10 and 11 convey hydrocarbon feed to each of the parallel convection coils of the first coil bank. Four feed conduits are represented in the FIGURE, but the invention is not limited to any particular number of feed conduits. For example, the invention is compatible with convection sections having 3, 4, 6, 8, 10, 12, 16, or 18 feed conduits for conveying in parallel portions of a total hydrocarbon feed to an equivalent number of convection coils located in the first coil bank. Although not shown, each of the plurality of feed conduits 11 may be provided with a valve (similar to valve 12). In other words, each of the plurality of conduits 11 can be in fluid communication with a convection coil (not shown) that (i) is located in the first coil bank and (ii) operates in parallel with convection coil 13. For simplicity, the description of the first convection coil bank will focus on convection coil 13. The other convection coils in the bank can be operated in a similar manner.

Dilution steam is provided via dilution steam conduit 20 through valve 22 to convection coil 23 for preheating by indirect transfer of heat from flue gas. Valve 22 is used to regulating the amount of dilution steam introduced into convection coil 23. Convection coil 23 is typically one of a plurality of convection coils that are arranged in a second coil bank for parallel dilution steam flow. Typically, a plurality of dilution steam conduits 20 and 21 convey dilution steam to each of the parallel convection coils of the second coil bank. Four dilution steam conduits are represented in the FIGURE, but the invention is not limited to any particular number of dilution steam conduits. For example, the invention is compatible with convection sections having 3, 4, 6, 8, 10, 12, 16, or 18 dilution steam conduits for conveying in parallel portions of an amount of total dilution steam to an equivalent number of convection coils located in the second convection coil bank. Although not shown, each of the plurality of dilution steam conduits 21 may be provided with a valve (similar to valve 22). In other words, each of the plurality of conduits 21 is in fluid communication with a convection coil (not shown) operating in parallel with convection coil 23. For simplicity, the description of the second convection coil bank will focus on coil 23. The other convection coils in the bank can be operated in a similar manner.

Preheated dilution steam and preheated hydrocarbon feed are combined in or proximate to conduit 25. The hydrocarbon+steam mixture is reintroduced into convection section 104 via conduit(s) 25, for preheating of the hydrocarbon+steam mixture in convection coil 30. Convection coil 30 is typically one of a plurality of convection coils that are arranged in a third coil bank for parallel flow of the hydrocarbon+steam mixture during pre-heating.

One convection coil for pre-heating hydrocarbon+steam mixture is represented in FIGURE, but the invention is not limited to any particular number of such convection coils. For example, the invention is compatible with a third coil bank having 3, 4, 6, 8, 10, 12, 16, or 18 hydrocarbon+steam mixture convection coils for conveying in parallel portions of a total amount of hydrocarbon+steam mixture. For simplicity, the description of the third convection coil bank will focus on coil 30. The other convection coils in the bank operate in a similar manner. The hydrocarbon+steam mixture is typically preheated in convection coil 30 to, e.g., to a temperature in the range of from about 750° F. to about 1400° F. (400° C. to 760° C.).

Cross-over piping 31 is used for conveying preheated hydrocarbon+steam mixture to radiant coil 40 in radiant section 103 for thermal cracking of the hydrocarbon. Radiant coil 40 is typically one of a plurality of radiant coils (the others are not shown), which together constitute a bank of radiant coils in radiant section 103. The temperature of the heated mixture exiting conduit 30 is generally designed to be at or near the point where significant thermal cracking commences. Process conditions, such as the amount of feed pre-heating in convection coil 13, the amount of steam pre-heating in convection coil 23, the amount of hydrocarbon+steam mixture pre-heating in convection coil 30, the relative amount of hydrocarbon feed and dilution steam, the temperature, pressure, and residence time of the preheated hydrocarbon+steam mixture in radiant coil 40, and the duration of the first time interval (the duration of pyrolysis mode in coils 13, 23, 30, and 40) typically depend on the composition of the hydrocarbon feed, yields of desired products, and the amount of coke accumulation in the furnace (particularly in radiant coils) that can be tolerated. Thus, heat transfer tubes as described herein are particularly useful as radiant coils 40. Although conventional hydrocarbon feeds and/or conventional process conditions used for the steam cracking, the heat transfer tubes of the invention are not limited to use with particular feeds or process conditions, and this description is not meant to foreclose other feeds and/or process conditions within the broader scope of the invention.

After the desired degree of thermal cracking has been achieved in the radiant section 103, the furnace effluent is rapidly cooled in cooling stage 50. Any method of cooling the furnace effluent may be used. In one aspect, cooling stage 50 comprises at least a primary transfer line exchanger (TLE). For hydrocarbon feeds which comprise liquid hydrocarbon, e.g., heavier naphthas and all gas-oil feeds, a direct oil quench connection is often required downstream of the primary TLE. The oil quench connection allows addition of quench oil into the pyrolysis product stream to provide heat transfer from the product stream directly to the injected quench oil. For this purpose, a quench medium, such as quench oil, is injected into the effluent via at least one fitting adapted for this purpose. Additional quenching stages can be utilized in cooling stage 50, and these stages can be operated in series, parallel, or series-parallel. Cooled furnace effluent exits via conduit 51 for further separation and/or processing, e.g., for removing ethylene and/or propylene from the furnace effluent. Besides or in addition to their use in the steam cracking furnace, the specified weldments can be utilized in one or more TLE's or quench stages thus described. The invention is not limited with regard to methods of cooling the furnace effluent.

Hydrocarbon Feeds

Heat transfer tubes described herein may be used for conveying substantially any hydrocarbon-containing feed that can produce light olefin by steam cracking. In certain aspects, the hydrocarbon comprises relatively high molecular weight hydrocarbons ("Heavy Feedstocks"), such as those which produce a relatively large amount of SCT during steam cracking. Examples of Heavy Feedstocks include one or more of steam cracked gas oil and residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, Ca/residue admixture, naphtha/residue admixture, gas oil/residue admixture, and crude oil. The hydrocarbon can have a nominal final boiling point of at least about 600° F. (315° C.), generally greater than about 950° F. (510° C.), typically greater than about 1100° F. (590° C.), for example greater than about 1400° F. (760° C.). Nominal final boiling point means the temperature at which 99.5 wt. % of a particular sample has reached its boiling point.

In another aspect, the hydrocarbon can contain naphtha as a major component (Naphtha Feedstocks). Naphtha Feedstocks can comprise a mixture of $C_5$ to $C_{10}$ hydrocarbons, for example $C_5$ to $C_8$ aliphatic hydrocarbons.

In other aspects, the hydrocarbon comprises one or more relatively low molecular weight hydrocarbon (Light Feedstocks), particularly those aspects where relatively high yields of $C_2$ unsaturates (ethylene and acetylene) are desired. Light Feedstocks typically include substantially saturated hydrocarbon molecules having fewer than five carbon atoms, e.g., ethane, propane, and mixtures thereof. The heat transfer tubes of the invention are particularly useful for steam cracking Light Feedstock, and more particularly as radiant tubes for the steam cracking of ethane.

EXAMPLES

Table 1 lists non-limiting examples of bulk alloy compositions that form a typically continuous aluminum oxide layer under thermal cracking conditions.

TABLE 1

Exemplary Bulk Alloy Compositions

| Ex | Strengthening Mechanism | Fe wt % | Ni wt % | Cr wt % | Al wt % | Nb wt % | C wt % | Mo wt % | Y wt % |
|---|---|---|---|---|---|---|---|---|---|
| 1 | Gamma Prime (γ') | 38 | 34 | 21.5 | 6.5 | | | | |
| 2 | Gamma Prime (γ') | 28 | 44 | 21.5 | 6.5 | | | | |
| 3 | Gamma Prime (γ') | 18 | 54 | 21.5 | 6.5 | | | | |
| 4 | Carbides ($M_{23}C_6$, MC) | 47 | 25 | 21.5 | 4.5 | 1.5 | 0.5 | | |
| 5 | Carbides ($M_{23}C_6$, MC) | 37 | 35 | 21.5 | 4.5 | 1.5 | 0.5 | | |
| 6 | Solid Solution | 47 | 25 | 21.5 | 4.5 | | | 3.0 | |
| 7 | Oxide Dispersion | 39 | 34 | 21.5 | 5.0 | | | | 0.5 |

Test Methods

Chemical composition may be determined by electron probe micro-analyzer (EPMA). EPMA is fundamentally the same as scanning electron microscopy (SEM) with the added capability of chemical analysis. The primary importance of EPMA is the ability to acquire precise, quantitative elemental analyses by wavelength dispersive spectroscopy (WDS). The spatial scale of analysis, combined with the ability to create detailed images of the sample, makes it possible to analyze materials in situ and to resolve complex chemical variation within single phases.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Unless otherwise stated, all percentages, parts, ratios, etc. are by weight. Unless otherwise stated, a reference to a compound or component includes the compound or component by itself, as well as in combination with other compounds or components, such as mixtures of compounds. Likewise, the term "comprising" is considered synonymous with the term "including". Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa. Aspects of the invention include those that are substantially free of, essentially free of, or completely free of any element, step, composition, ingredient or other claim element not expressly recited or described.

The invention claimed is:

1. A heat transfer tube comprising, a carburization-resistant alloy comprising a) 25 to 55 wt. % nickel; b) 18 to 24 wt. % chromium; c) 4 to 7 wt. % aluminum; d) iron; and e) at least one strengthening mechanism component, the weight percents being based on the total weight of the alloy, wherein the strengthening mechanism includes one or more of:
   (i) carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon;
   (ii) gamma prime (γ') strengthening mechanisms comprising $Ni_3Al$ and less than 0.15 wt. % carbon;
   (iii) solid solution strengthening mechanisms comprising 2.0 to 4.0 wt. % of at least one element selected from vanadium, niobium, tantalum, molybdenum, tungsten, and less than 0.4 wt. % carbon; and
   (iv) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

2. The heat transfer tube of claim 1, where the heat transfer alloy comprises one or more of strengthening mechanisms (ii); (iii); or (iv) and less than 0.15 wt. % carbon.

3. The heat transfer tube of claim 1, where the heat transfer alloy comprises one or more of the following: 4.5 to 6.5 wt. % aluminum, 30.0 to 50.0 wt. % nickel, and 20.0 to 21.9 wt. % chromium.

4. The heat transfer tube of claim 1, where the carburization-resistant alloy further comprises less than 0.5 wt. % silicon.

5. The heat transfer tube of claim 1, further comprising a substantially-continuous oxide layer covering at least 75% the tube's inner surface area, wherein the oxide layer comprises oxide of at least a portion of the aluminum.

6. The heat transfer tube of claim 5, where the oxide layer is substantially free of chromium.

7. A centrifugally cast pyrolysis tube, comprising a) 25 to 55 wt. % nickel; b) 18 to 24 wt. % chromium; c) 4 to 7 wt. % aluminum; d) iron; and e) at least one strengthening mechanism selected from:
- (i) carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon;
- (ii) gamma prime (γ') strengthening mechanisms comprising $Ni_3Al$ and less than 0.15 wt. % carbon;
- (iii) solid solution strengthening mechanisms comprising 2.0 to 4.0 wt. % of at least one element selected from vanadium, niobium, tantalum, molybdenum, tungsten, and less than 0.4 wt. % carbon; and
- (iv) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

8. A method for producing a heat transfer tube comprising, providing a carburization-resistant alloy and centrifugally casting the carburization-resistant alloy to produce a heat transfer tube, where the carburization-resistant alloy comprises a) 25 to 55 wt. % nickel; b) 18 to 24 wt. % chromium; c) 4 to 7 wt. % aluminum; d) iron; and e) at least one strengthening mechanism component selected from:
- (i) carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon;
- (ii) gamma prime (γ') strengthening mechanisms comprising $Ni_3Al$ and less than 0.15 wt. % carbon;
- (iii) solid solution strengthening mechanisms comprising 2.0 to 4.0 wt. % of at least one element selected from vanadium, niobium, tantalum, molybdenum, tungsten, and less than 0.4 wt. % carbon; and
- (iv) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

9. A method for producing olefins comprising, pyrolysing a hydrocarbon feed in a heat transfer tube comprising a carburization-resistant alloy, where the carburization-resistant alloy comprises a) 25.1 to 55.0 wt. % nickel; b) 18.1 to 23.9 wt. % chromium; c) 4.1 to 7.0 wt. % aluminum; d) iron; and f) at least one strengthening mechanism comprising:
- (i) carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon;
- (ii) gamma prime (γ') strengthening mechanisms comprising $Ni_3Al$ and less than 0.15 wt. % carbon;
- (iii) solid solution strengthening mechanisms comprising 2.0 to 4.0 wt. % of at least one element selected from vanadium, niobium, tantalum, molybdenum, tungsten, and less than 0.4 wt. % carbon; and
- (iv) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

10. The method of claim 9, further comprising forming an oxide layer at the heat transfer tube's inner surface, wherein the oxide layer includes oxide of at least a portion of the aluminum.

11. The method of claim 10, wherein the oxide layer is substantially free of chromium.

12. The method of claim 10, wherein the oxide layer is substantially-continuous and covers at least 75% the tube's inner surface area.

13. A steam cracker furnace, the furnace comprising:
- (a) a convection section which includes at least one convection tube adapted for indirectly heating a mixture comprising hydrocarbon and steam,
- (b) a radiant section which includes at least one radiant tube adapted to (i) receive the heated mixture, (ii) expose the heated mixture in the radiant tube to steam cracking conditions in order to produce cracked products, and (iii) convey away from the radiant section an effluent comprising at least a portion of the cracked products; wherein,
  - (A) the radiant and/or convection tube comprise a protective layer covering ≥70% of the tube's internal surface area, and
  - (B) the layer is formed from a carburization-resistant alloy, where the carburization-resistant alloy comprises a) 25.1 to 55.0 wt. % nickel; b) 18.1 to 23.9 wt. % chromium; c) 4.1 to 7.0 wt. % aluminum; d) iron; and f) at least one strengthening mechanism comprising:
    - (I) carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon; or at least one of:
    - (II) gamma prime (γ') strengthening mechanisms comprising $Ni_3Al$ and less than 0.15 wt. % carbon;
    - (III) solid solution strengthening mechanisms comprising 2.0 to 4.0 wt. % of at least one element selected from vanadium, niobium, tantalum, molybdenum, tungsten, and less than 0.4 wt. % carbon; and
    - (IV) oxide dispersoid strengthening mechanisms comprising 0.1 to 1.0 wt. % of at least one element selected from yttrium, lanthanum, cerium, scandium, praseodymium, neodymium and less than 0.4 wt. % carbon.

14. The steam cracker furnace of claim 13, wherein the protective layer is a substantially-continuous carburization-resistant layer covering ≥90% of the tube's internal surface area.

15. The steam cracker furnace of claim 13, further comprising a second layer located adjacent to and outward of the carburization-resistant layer, the second layer comprising at least one ferrous alloy.

16. A method for forming a carburization-resistant layer at the inner-surface of a heat transfer tube, the method comprising:
- (a) casting a carburization-resistant alloy to produce a heat transfer tube, where the carburization-resistant alloy comprises a) 25 to 55 wt. % nickel; b) 18 to 24 wt. % chromium; c) 4 to 7 wt. % aluminum; d) iron; and e) at least one strengthening mechanism component selected from:
  - (i) carbides strengthening mechanisms comprising 1.0 to 2.0 wt. % of at least one element selected from titanium, zirconium, hafnium, vanadium, niobium, tantalum, molybdenum, tungsten, and 0.4 to 0.6 wt. % carbon;
  - (ii) gamma prime (γ') strengthening mechanisms comprising $Ni_3Al$ and less than 0.15 wt. % carbon;

(iii) solid solution strengthening mechanisms comprising 2.0 to 4.0 wt. % of at least one element selected from vanadium, niobium, tantalum, molybdenum, tungsten, and less than 0.4 wt. % carbon; and (iv) oxide dispersoid strengthening mechanisms comprising 0.1 to 1.0 wt. % of at least one element selected from yttrium, lanthanum, cerium, scandium, praseodymium, neodymium and less than 0.4 wt. % carbon; and carrying out at least one of the following treatments:

(b) exposing the inner surface of the tube to a controlled low oxygen partial pressure environment at a tube temperature ≥500° C.; or (c) exposing the tube's interior in an oxidizing environment at a tube temperature in the range of 900° C. to 1050° C.

17. The method of claim 16, wherein layer covers ≥75% of the inner surface of the tube.

18. The method of claim 16, wherein the carburization-resistant layer is substantially-continuous and covers ≥90% of the inner surface of the tube.

19. The method of claim 16, wherein step (b) or (c) is carried out for one hour or more.

20. The method of claim 16, wherein the carburization-resistant alloy comprises 0.005 wt. % to 0.06 wt. % of one or more rare earth elements.

21. The method of claim 16 wherein the carburization-resistant alloy comprises ≤2 wt. % of tungsten.

22. The method of claim 16, wherein the carburization-resistant layer has a thickness in the range of from 1 micrometer to 100 micrometer.

* * * * *